ENCODED SYNCHRONOUS DEMODULATOR CIRCUIT

Filed Dec. 21, 1965 2 Sheets-Sheet 1

INVENTORS
CHARLES P. WOMACK
JAMES K. BOOMER
BY
Moody and Kutzinger
ATTORNEYS

INVENTORS
CHARLES P. WOMACK
JAMES K. BOOMER
BY
Moody and Kirchinger
ATTORNEYS

United States Patent Office 3,376,514
Patented Apr. 2, 1968

3,376,514
ENCODED SYNCHRONOUS DEMODULATOR CIRCUIT

Charles P. Womack, Marion, Iowa, and James K. Boomer, Kettering, Ohio, assignors to Collins Radio Company, Cedar Rapids, Iowa, a corporation of Iowa
Filed Dec. 21, 1965, Ser. No. 515,312
10 Claims. (Cl. 329—50)

Figures 1, 3:
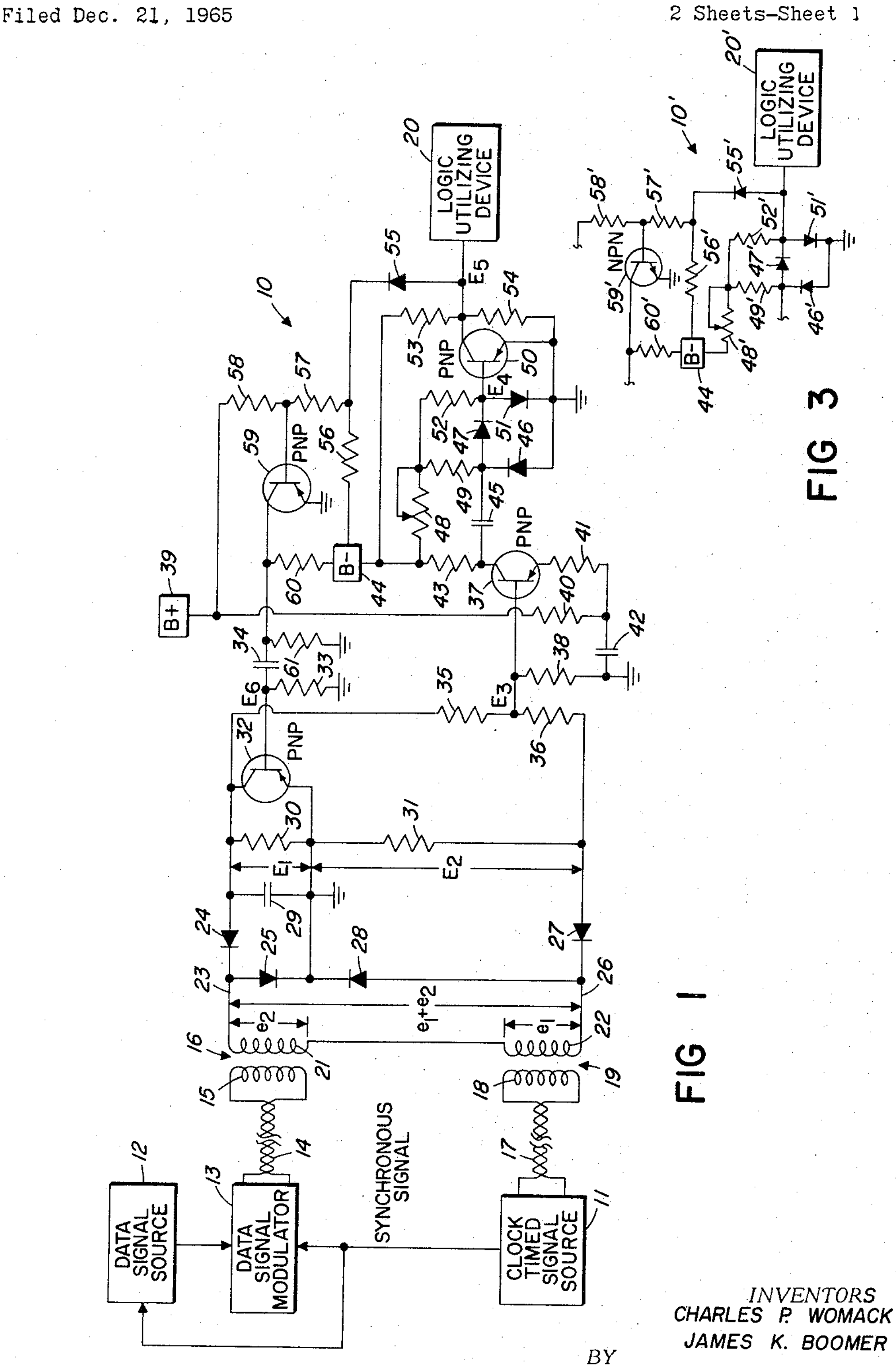

This invention relates in general to data detection and demodulation, and in particular, to a phase script data demodulator circuit providing efficient demodulation of data intelligence from phase script encoded waveforms in a data transmission system providing efficient utilization of available signal power and giving quality data transmission over extended wire links in an extremely fast, relatively inexpensive and reliable data transmission system.

There has been, through recent years, an ever-increasing requirement for efficient transmission of digital data between separate and isolated points or equipments at high speed, low cost, and with high reliability. Frequently equipments may comprise two or more computers in a satellite configuration, or a single computer and its associated input and/or output devices. Many such equipments are located at sites quite remote from each other with data interchange required over distances in the many hundreds of feet and even up into the thousands of feet. Various systems have been devised for data transmission under such conditions, one providing for data bit transfer rates of 40,000 bits per second over one-half mile, and another attains a transmission rate of approximately 50,000 bits per second over a transmission line distance of several miles. Such performance rates, however, fall far short of data modulation, transmission and demodulation at an intelligible level with high speed interchange transmission rates in excess of 2,000,000 bits per second over, for example, a 240 kc. channel twisted pair transmission line more than one-half mile in length. This is accomplished using circuits designed to utilize substantially all the remaining energy in each data pulse in demodulation after distortion through and by the transmission medium. Further, while the clock, or reference, signal is passed through the same distortion producing media as the data pulses, a detector, in a reeciving station of applicant's system, is required merely to compare the relative phase of two signals regardless of waveshape. Thus, the demodulator circuit receives a phase script commutated data encoded transmission of the system and demodulates the data intelligence from the transmitted phase script modulated signal. For example, in such a phase script encoded signal transmission system an input signal in phase with the master clock is, in a predetermined approach, the result of a logic ZERO input and is classified as a logic ZERO in phase script. In the same fashion, an out-of-phase output is classified as a ONE.

It is, therefore, a principal object of this invention to provide demodulation of digital data from a transmitted phase script intelligence encoded signal for efficient utilization of available signal power.

Another object is to attain digital data demodulation rates from phase script intelligence encoded transmitted signals up in the range of several megabits per second with quality signal transmissions over extended wire links in an extremely fast, relatively inexpensive and reliable data transmission system.

A further object is to improve the signal-to-noise power ratio in transmitted intelligence through the use of phase inscription and with demodulation performed using synchronous detection with the received signal and noise compared to a reference voltage bearing an in-phase relationship to the signal and random phase relationship to the noise.

Features of this invention useful in accomplishing the above objects include two input transformers, one receiving a clock timed signal reference signal and the other receiving a phase script modulated clock referenced signal with the transformer secondary coils so connected as to provide signal cancelling with one phase relation and a summed signal with the other signal phase relation on the two output lines of the transformer section. The first phase of the summed voltage developed across the connected secondary coils, when the signals develop across the respective coils are mutually additive rather than cancelling, is detected by one input rectifier section to store a signal on a capacitor, and the immediately following phase of the signal is rectified by a second rectifier section connected to the other output side of the connected secondary coils. These two rectified signals are added at a summation point and then passed through a linear amplifier to a voltage threshold level actuated diode circuit effectively producing a resultant data signal waveform with substantially square wave positive going signal pulses. This waveform is then amplified and inverted by an additional transistor amplifying stage and passed as an output to logic utilizing circuitry. This output signal is also effective to activate and deactivate a control signal feedback circuit that effectively biases an additional transistor to conduction to act as a brief time short across the first phase signal voltage storing capacitor to quickly discharge the capacitor and quickly make ready for each succeeding information pulse signal in an input signal bit phase script modulated signal train.

A specific embodiment representing what is presently regarded as the best mode of carrying out the invention is illustrated in the accompanying drawings.

Figure 2:
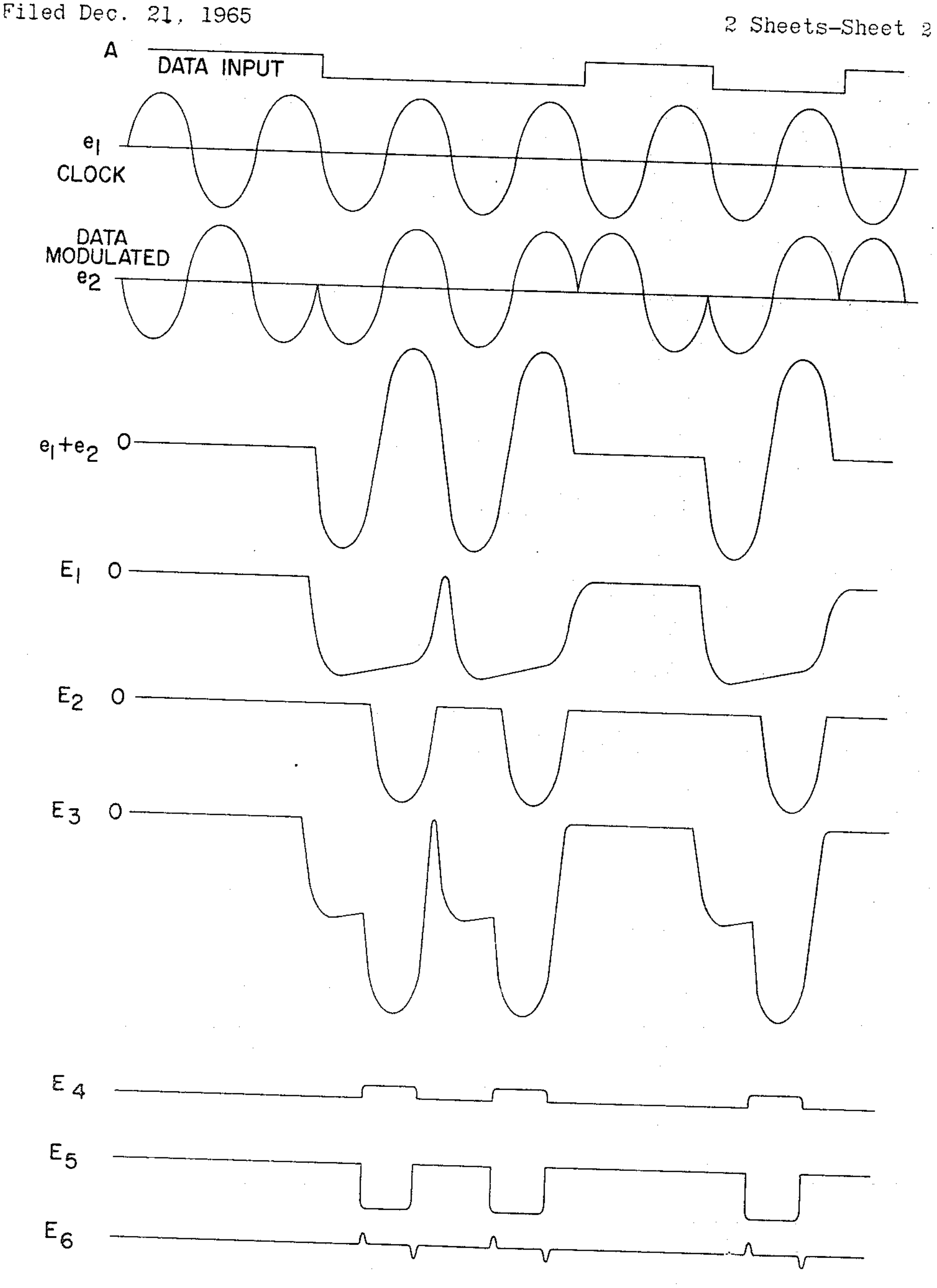

In the drawings:

FIGURE 1 represents a combination system block and data demodulator circuit schematic;

FIGURE 2, a family of curves including a modulator data input curve, a sinusoidal clock reference curve, intermediate voltage waveform curves at various periods in the circuit and ultimately a data output waveform particularly adapted for acceptance and use in an existing logic utilizing device; and, FIGURE 3, an alternate data demodulator embodiment partial circuit schematic.

Referring to the drawings:

The data demodulator circuit 10 is shown in a phase script modulated intelligence transmission system including a clock timed signal reference source 11, a data signal source 12, which receives a synchronous signal from the clock source, and a data signal modulator 13 receiving inputs from both the clock signal reference source 11 and the data signal source 12. The data signal modulator 13 provides a clock signal modulated output transmitted through a twisted pair line 14 of extended length to the input primary coil 15 of a data modulated signal input transformer 16. A clock signal output from clock signal reference source 11 is, in like manner, fed through a twisted pair line 17 as an input signal to the primary coil 18 of clock signal input transformer 19. The ultimate output of the data demodulator circuit 10 is fed as an input to a logic utilizing device 20.

The secondary coils 21 and 22 of the modulated data signal input transformer 16 and the clock reference signal input transformer 19, respectively, are circuit connected with appropriate polarizations to obtain the desired signal summation across the two output transformer secondary coils 21 and 22 circuit. This is with the coils 21 and 22 having a common junction between single ends of both coils and having an output line connection from each opposite coil end to the remaining circuitry of the data demodulator circuit 10. The output line 23 of the output secondary coil 21 of transformer 16 is connected to the common junction of diodes 24 and 25 and in like manner the output line 26 of the secondary coil 22 of transformer 19 is connected to the common junction of diodes 27 and 28. There is a common connection between diodes 25 and 28 and ground, and all four of the diodes 24, 25, 27 and 28 are circuit oriented cathodes toward this common junction between diodes 25 and 28 with ground.

A capacitor 29 is connected between the anode of diode 24 and ground, and in addition, two substantially equal value resistors 30 and 31 are provided with resistor 30 connected in parallel with capacitor 29 between the anode of diode 24 and ground and resistor 31 connected between the anode of diode 27 and ground. A PNP transistor 32 is provided with its emitter connected to ground and its collector also connected to the anode of diode 24. The base of transistor 32 is connected through resistor 33 to ground and to a capacitor 34 of a feedback signal circuit. Two additional substantially equal value resistors 35 and 36 are serially connected between the anode of diode 24 and the anode of diode 27. The common junction of resistors 35 and 36 is connected to the base of PNP transistor 37 and also through resistor 38 to ground.

A positive voltage supply 39 is serially connected through resistors 40 and 41 to the emitter of PNP transistor 37, and at the common junction of resistors 40 and 41 through capacitor 42 to ground. The signal output collector of transistor 37 is connected through resistor 43 to a minus voltage supply 44 and through a signal coupling capacitor 45 to the common junction of diodes 46 and 47. The minus voltage supply 44 is also connected through an adjustable resistor 48 and resistor 49, which actually may be a part of the adjustable resistor 48, to the common junction of capacitor 45 and the diodes 46 and 47.

The signal path of the circuit is through diode 47 to base of signal amplifying and inverting PNP transistor 50. A diode 51 is connected between the common junction of diode 47 with the base of transistor 50 and ground. The three diodes 46, 47 and 51 are part of a waveform clipping and shaping, and also bias level controlling circuit. This circuit also includes a connection, from the common junction of diodes 47 and 51 and the base of transistor 50, through resistor 52 to minus voltage supply 44. The diodes 46, 47 and 51 in this circuit are in clockwise anode to cathode orientation in a circuit loop with the anode of diode 46 and the cathode of diode 51 connected to ground. The emitter of transistor 50 is connected to ground, and to further insure proper bias for transistor 50, the output collector is connected to a common junction of resistors 53 and 54 serially connected between the negative voltage supply 44 and ground.

In addition to the bias connection and the output connection to logic utilizing device 20, the collector of transistor 50 is provided with a feedback circuit connection to the anode of diode 55. The feedback circuit path extends through the diode 55 with the diode having a cathode connection through resistor 56 to the minus voltage supply 44, and serially through resistors 57 and 58 to positive voltage supply 39 for desired diode 55 operational biasing. The feedback signal path extends through a connecting line from the common junction of resistors 57 and 58 to the base of waveform voltage inverting PNP transistor 59. To complete biasing for the transistor 59, it is provided with an emitter connection to ground, and its feedback signal output collector, which is connected to feedback capacitor 34, is also connected through resistor 60 to minus voltage supply 44, and also through resistor 61 to ground.

Referring also to the voltage waveform curves of FIGURE 2, a signal waveform such as indicated by the modulator data input waveform A is provided by the data signal source 12 so synchronized as to have data signal changes substantially in alignment with periodic clock signal zero crossings when data signal changes do occur. This results in a data clock signal waveform as indicated by waveform $e_1$ being modulated to the phase script modulated signal waveform $e_2$ as induced across the secondary coils 21 and 22 of data modulated signal input waveform receiving transformer 16 and the clock reference signal receiving transformer 19, respectively. The demodulator circuit 10 which has accepted and detected information at information rates as high as four megabits and even higher, detects the signal phase difference of the data signal to the clock reference signal out of the secondary coils of the signal input transformers 16 and 19, respectively.

The first phase of the summed voltage across the connected secondary coils of the first two transformers, as represented by the $e_1+e_2$ summation waveform is detected when the input signals $e_1$ and $e_2$ are not mutually cancelling. The first phase of the $e_1+e_2$ signal, when the signals $e_1$ and $e_2$ are in additive phase, is stored on the input stage capacitor 29 immediately following the input signal rectifier section formed by diodes 24 and 25 to give a stored signal waveform on capacitor 29 as represented by waveform $E_1$.

The second phase of the $e_1+e_2$ signal is detected by the input signal rectifier section including diodes 27 and 28 to provide an output waveform $E_2$ developed between the anode of diode 27 and ground. These are effectively added together at the common junction of resistors 35 and 36 to produce at that point a summation waveform $E_3$. This results advantageously in an improved higher signal-to-noise ratio thereby greatly improving the range of detectable received signal levels. The resulting signal $E_3$ above a predetermined and designed for level biases transistor 37 to conduction. This enables transistor 37 to act as a linear amplifier for the signal content above the predetermined input level at the common connection of the junction of resistors 35 and 36 and the base of transistor 37. The signal output of transistor 37 is passed through capacitor 45, to a voltage threshold level activated diode circuit thereby producing the resultant signal waveform $E_4$ at the base of transistor 50. Each positive going pulse of this signal turns off transistor 50 through the duration of the respective information signal bit input to provide an output waveform $E_5$. It is an output signal with repeated pulses being produced that are substantially coincident with each input signal successive half cycle coincident with waveform $E_2$ pulse excursions through the duration of each data modulated input signal calling for such output pulses.

While the signal output waveform $E_5$ is the output passed from the data demodulator circuit 10 as an output to utilizing circuitry, such as indicated by logic utilizing device 20, this same signal is utilized in a control feedback circuit through diode 55 to bias the transistor 59. Thus, transistor 59 is biased to conduction and non-conduction in the control feedback circuit as appropriate to develop through capacitor 34 a capacitor integrated waveform $E_6$ at the base of PNP transistor 32. This waveform produces a negative going peak spaced in time substantially immediately after each information pulse in the $E_5$ waveform that effectively biases PNP transistor 32 to a state of conduction for a brief moment providing a short duration electrical short across capacitor 29 quickly discharging the capacitor to make ready for each succeeding information pulse cycle in a signal bit input train. In this control feedback circuit with each negative signal pulse biasing of diode 55 to non-conduction, the base of PNP transistor 59 is immediately biased to a lower voltage potential and thereby fired to conduction to immediately apply a positive going charge on the adjacent side of capacitor 34. This is differentiated by the capacitor 34 to provide the $E_6$ waveform having a negative going peak, PNP transistor 32 biasing to conduction, after cutoff of each negative going pulse in the $E_5$ waveform.

Components and values used in a data demodulator circuit 10 used for demodulating phase script intelligence to 0 volt and −3 volt standard logic signal voltage levels for use in a particular existing logic device 20, and with bit rate capabilities exceeding 4,000,000 bits per second according to applicants' teaching include the following:

| | |
|---|---|
| Transformers **16** and **19** each with extended length 240 kc. channel twisted pair transmission line inputs approximating one-half mile in length (transformation winding ratios each) | 1:1 |
| Silicon diodes **24, 25, 27, 28, 46,** and **55** | 1N4310 |
| Capacitor **29** ----pf | 500 |
| Resistors **30, 31, 35** and **36** ----ohms | 4.7K |
| PNP transistors **32, 37, 50** and **59** | 2N428 |
| Resistors **33** and **61** ----ohms | 560 |
| Capacitor **34** ----pf | 15 |
| Resistor **38** ----ohms | 27K |
| Voltage supply **39** ----volts | +20 |
| Resistors **40** and **53** ----ohms | 2.7K |
| Resistor **41** ----ohms | 68 |
| Capacitor **42** ----microfarads | 0.01 |
| Resistor **43** ----ohms | 1.2K |
| Voltage supply **44** ----volts | −20 |
| Capacitor **45** ----microfarads | 0.001 |
| Diodes **47** and **51** | 1N270 |
| Adjustable resistor **48** ----ohms | 25K |
| Resistors **49** and **52** ----do | 5.6K |
| Resistor **54** ----do | 470 |
| Resistor **56** ----do | 6.8K |
| Resistor **57** ----do | 1K |
| Resistor **58** ----do | 18K |
| Resistor **60** ----do | 5K |

It should be noted that the clock reference signal supplied by clock timed signal source 11 in a working system could be a random frequency clock signal with certain limitations. Limitations for such a random frequency clock signal include a lower frequency limit with the minimum rate having maximum cycle lengths equal to data signal bit cycle length at the maximum data signal input rate, and a high frequency limit compatible with the intelligence bit rate handling capabilities of the system.

In the embodiment of FIGURE 3 portions of the circuit not shown are substantially the same as corresponding portions in the embodiment of FIGURE 1, and elements of the portion shown are given primed numbers corresponding to similar acting components in the embodiment of FIGURE 1. The data demodulator 10' of FIGURE 3 does not include counterparts for transistor 50 and resistors 53 and 54 of the FIGURE 1 embodiment, and diode 55', the substantial equivalent of diode 55, has a direct anode connection to the common junction of diodes 47' and 51' and resistor 52' without a counterpart of transistor 50 being in the circuit. This data demodulator 10' is used to supply a data bit output waveform such as shown by the $E_4$ waveform of FIGURE 2 which, for example, may vary from a minus voltage with positive going pulses up to 0 volts or any appropriate combination of closely spaced voltage levels compatible as logic input levels to logic utilizing device 20'. Diodes 46', 47', 51' and 55' may vary from their counterparts in the FIGURE 1 embodiment in order to provide desired bias to conduction voltage levels in obtaining the desired $E_4$ waveform voltage differential, and to provide adequate voltage biasing through diode 55' with positive going pulses to fire NPN transistor 59' to conduction. With this embodiment, positive going pulses bias diode 55' to conduction and bias transistor 59' to conduction rather than with the embodiment of FIGURE 1, the biasing of diode 55 to non-conduction by the negative going pulses of the $E_5$ waveform of FIGURE 2 to accomplish the simultaneous firing of PNP transistor 59 to conduction. Obviously, various resistors would be of different values than their counterparts in the embodiment of FIGURE 1 in order to provide desired biasing control levels required for the NPN transistor 59', used in place of the PNP transistor 59 of FIGURE 1, with the opposite going voltage polarity $E_4$ waveform signal levels providing operation to develop the same ultimate operational results in providing the feedback control circuit $E_6$ waveform as far as the rest of the circuitry is concerned, and also to provide desired diode bias operation in obtaining desired output voltage signal levels.

Whereas this invention is here illustrated with respect to two specific embodiments thereof, it should be realized that various changes may be made without departing from the essential contribution to the art made by the teachings hereof.

We claim:

1. In an encoded signal data demodulator circuit: signal input means constructed for receiving two input signals with one from a clock signal source and the other from a data modulated clock signal timed signal source; said signal input means including a circuit having two output connections across which with one phase relation of the two input signals there is a signal cancelling effect, and with the opposite phase relation there is a signal additive effect; a first signal rectifying circuit connected to one of said output connections and to a voltage potential reference source, and a second signal rectifying circuit connected to the other of said output connections and to the voltage potential reference source; a signal voltage charging device connected between the first signal rectifying circuit and the voltage potential reference source; voltage bias controlled to conduction-and-non-conduction means connected across said charging device; a signal summing circuit connected between said first and second signal rectifying circuits; signal path means connecting said signal summing circuit and a voltage threshold level activated circuit providing a resultant two voltage level signal waveform as determined by the signal waveform out of the summing circuit; output signal circuit path means from said voltage threshold level activated circuit; and control feedback circuit signal means interconnecting said output signal circuit path means and said voltage bias controlled to conduction-and-non-conduction means.

2. The data demodulator circuit of claim 1, wherein said signal input means constructed for receiving two input signals includes two signal coupling input transformers, one connected to receive a signal from a clock signal source and the other transformer connected to receive a signal from a data modulated clock signal timed signal source; and with the circuit having two output connections including, secondary coil winding means of both transformers with the end of a secondary coil winding of one transformer connected to an end of a secondary coil winding of the other transformer and with the other ends of the two mutually connected secondary coil windings being the two output connections of said signal input means.

3. The data demodulator circuit of claim 1, wherein the voltage potential reference source is ground; and said signal voltage charging device is a capacitor.

4. The data demodulator circuit of claim 1, wherein said voltage bias control to conduction and non-conduction means connected across said charge device is a transistor with a first electrode connection to one side of said charging device, and a second electrode connection to the opposite side of said charging device.

5. The data demodulator circuit of claim 4, wherein said signal summing circuit has an output connection to said signal path means; and includes resistive means between the signal summing circuit output connection and each respective first and second signal rectifying circuits.

6. The data demodulator circuit of claim 5, wherein said voltage threshold level activated circuit includes at least three unidirectional current flow devices, with one of the unidirectional devices in the through signal path, and the other two unidirectional devices connected between respective opposite electrodes of the unidirectional current flow device in the through signal path and ground, and with the two connected to ground opposite orientation one from the other in their connection to ground.

7. The data demodulator circuit of claim 6, wherein said signal path means connecting the signal summing circuit to the voltage threshold level activated circuit includes signal amplifying means.

8. The data demodulator circuit of claim 6, wherein said control feedback circuit signal means includes a unidirectional current flow device connected to said output signal circuit path means, and circuit signal differentiating means subject to activation and deactivation by output signal biasing of the unidirectional current flow device of the control feedback circuit to conduction and non-conduction.

9. The data demodulator circuit of claim 8, wherein said output signal circuit path means includes a signal amplifying transistor with bias connections resulting in signal inversion.

10. The data demodulator circuit of claim 8, wherein said circuit signal differentiating means includes a capacitor connected to a first electrode of a transistor having a second electrode connection to ground and a third base electrode connection to said unidirectional current flow device in said control feedback circuit.

References Cited

UNITED STATES PATENTS

| | | | |
|---|---|---|---|
| 3,119,964 | 1/1964 | Crafts ------------ | 178—66 X |
| 3,223,925 | 12/1965 | Florac et al. ------- | 178—66 X |
| 3,265,976 | 8/1966 | Broadhead -------- | 329—50 X |

ALFRED L. BRODY, *Primary Examiner.*